United States Patent [19]

Lundquist

[11] Patent Number: 5,236,133
[45] Date of Patent: Aug. 17, 1993

[54] METHOD OF CONTAINER LABEL REMOVAL

[76] Inventor: Lynn C. Lundquist, 10833 NE. Russell, Portland, Oreg. 97220

[21] Appl. No.: 982,513

[22] Filed: Nov. 27, 1992

Related U.S. Application Data

[63] Continuation-in-part of Ser. No. 802,452, Dec. 4, 1991, abandoned.

[51] Int. Cl.⁵ .............................................. B02C 23/30
[52] U.S. Cl. ........................................ 241/19; 241/24; 241/57; 241/79.1; 241/DIG. 38
[58] Field of Search ................ 241/19, 24, 29, 57, 241/79.1, DIG. 38

[56] References Cited

U.S. PATENT DOCUMENTS

| | | | |
|---|---|---|---|
| 3,412,770 | 11/1968 | Johnson | 146/192 |
| 4,440,635 | 4/1984 | Reiniger | 209/4 |
| 4,673,134 | 6/1987 | Barthelmess | 241/57 |
| 5,035,367 | 7/1991 | Nojima | 241/37.5 |
| 5,045,090 | 9/1991 | Pohl | 51/26 |
| 5,110,055 | 5/1992 | Teeny | 241/15 |
| 5,158,240 | 10/1992 | Ihara et al. | 241/172 |
| 5,186,400 | 2/1993 | Ignjatovic et al. | 241/39 |

FOREIGN PATENT DOCUMENTS 663350 5/1979 U.S.S.R.
1072898 2/1984 U.S.S.R.

*Primary Examiner*—Irene Cuda
*Assistant Examiner*—John M. Husar

[57] ABSTRACT

This method is an improvement of an existing apparatus and method employed to remove paper or plastic film labels from plastic blow molded bottle scrap. Mechanical improvements have been made in two areas. The first area of improvement consists of the addition of multiple stages to the vertically mounted rotating blade assembly and cooperating multiple stationary elements within the stator assembly. The second area of improvement is within the air induction system and consists of improvements of the flow and control of the air stream which entrains the waste from the process mass. The method improvement of this invention results from the employment of these mechanical advancements.

14 Claims, 4 Drawing Sheets

5,236,133

METHOD OF CONTAINER LABEL REMOVAL

This is a continuation in part of application Ser. No. 07/802,452 filed Dec. 4, 1991, entitled ENHANCEMENT OF LABEL REMOVAL APPARATUS now abandoned.

BACKGROUND—FIELD OF THE INVENTION

This method improves the performance of an existing method and apparatus used to remove paper or plastic film labels from plastic scrap material prior to reprocessing.

BACKGROUND—DESCRIPTION OF THE PRIOR ART

Within present plastic material reclamation technology, equipment has been developed to remove adhesively backed labels from granulated plastic scrap. In particular, granulated material from such plastic products as milk jugs, oil containers, and the like, will have label remnants adhering to the plastic granulate subsequent to the granulation process. This fiber (paper label) or film (plastic label) material must be removed prior to the final reprocessing into usable plastic pellets.

Within the plastic reprocessing industry a number of processes with the objective of label removal have been developed. Of particular concern to this invention is a so called "kinetic" process developed by Partek, Corp. of Vancouver, Wash., issued as U.S. Pat. No. 5,110,055. (The apparatus proper is identified as a "refiner".) The Partek process uses a rotating, flat faced blade within a containment vessel to flail the granulate and separate the fibrous label material.

OBJECTIVES OF THE INVENTION

This method was developed to improve the efficiency of the existing Partek process used to separate labels, adhesives, and other contaminants from granulated materials prior to final reprocessing. In particular, this is the case encountered while cleaning blow molded plastic containers contaminated with either fiber (paper) or plastic labels which are affixed to the container with adhesives. Furthermore, it was designed with a number of specific objectives considering its potential application.
1. It is the general objective of this method to increase the rotor efficiency of the apparatus which will reduce process dwell time.
2. Another objective of this method is to improve the air flow through the material which will more quickly remove fiber contaminants (referred to as "fines" within the industry).
3. Another objective of this method is to simplify the construction of a multiple blade rotor.
4. Another objective of this method is to provide a classification means which will allow higher air velocity in the fiber waste entrainment while avoiding undue process material waste.
5. A final objective of this method is to distribute the material during processing in such a way that the above objectives may most efficaciously be achieved.

These and other objectives and advantages of the present method, and the manner in which they are achieved, will become apparent in the following specifications and claims.

SUMMARY OF THE INVENTION

An improvement of the existing apparatus and method developed by Partek Corp. is achieved with the development of a multiple blade rotor and cooperating stator bars. Multiple rotor blades (and cooperating stators) reduce the slope of the material in the containment vessel (thus reducing the idle material circulating away from the rotor blade and stator), and increase the process material contact with the rotor and stator parts of the device. This improvement increases the frequency of contact between the moving members and the contaminated plastic granulate resulting in more efficient utilization of the equipment and reduced process dwell time.

A secondary concern of this method is that of improving the efficiency of separation of the fiber (or film plastic) waste from the salvageable material. This is achieved by forcing the entraining air flow through the process mass. A classification and air lock system allows the velocity of this entrainment air to be increased while at the same time reducing the loss of salvageable material.

DESCRIPTION OF THE PREFERRED EMBODIMENTS

Figure 1:
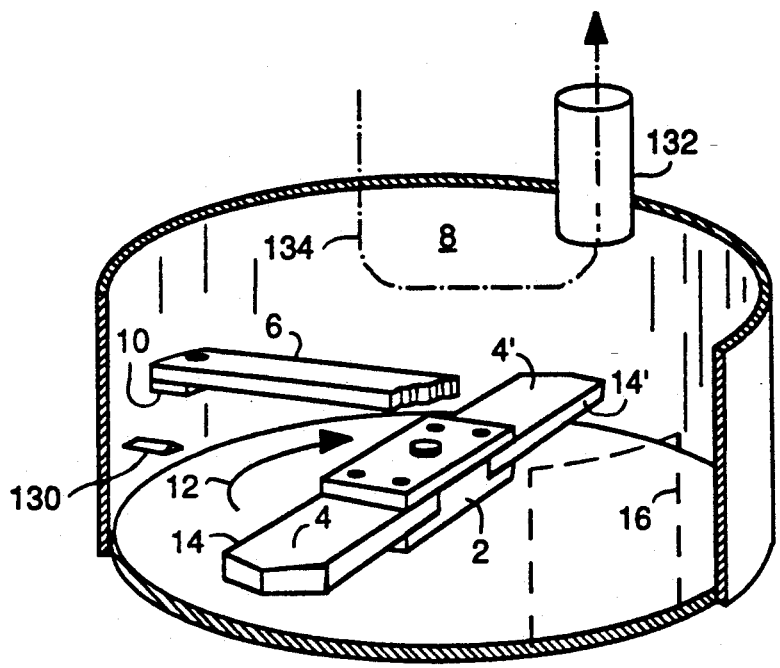
FIG. 1 is a perspective view of the prior art with a partial cut-away section.

To simplify the description, symmetrical parts, or portions of a single part where divided by a sectional view, will be designated with a prime ('). The description of the part(s) having primed reference characters will be limited.

The primary concern of this field of technology is that of cleaning plastic scrap material which has been reduced to substantially chip size pieces. In the preferred practice, these plastic chips nominally measure one-half inch by one-half inch in one plane, and the thickness of the plastic material in the other plane. In a second practice, the granulated material will be of random dimension in the first plane, but will not exceed one-half inch in the longest diagonal dimension. This material will be referred to as "granulate", and the process as "granulation", within the body of this disclosure.

Referring now to FIG. 1, it can be seen that the prior art consists of a rotating blade assembly 2 consisting of removable blade sections 4. The rotating blade assembly 2 is centrally mounted to a drive shaft which will be shown in successive drawings. In the prior art, a stator blade member 6 is affixed to the containment vessel 8 by means of internally welded stator blade mounting tabs 10.

The rotating blade assembly 2 revolves in a direction of rotation as indicated by arrow 12, and interacts with the plastic granular material within the vessel on the leading edge 14 of the rotating blade assembly 2. When a stator blade member 6 is used, the impact frequency imparted to the granulate material is substantially increased by its necessary interaction with the leading edge 14 of the rotating blade assembly 2 and the stationary stator blade member 6.

When the process is complete, the granulate material is discharged through the discharge door opening which is indicated by the broken lines at 16.

Figure 2:
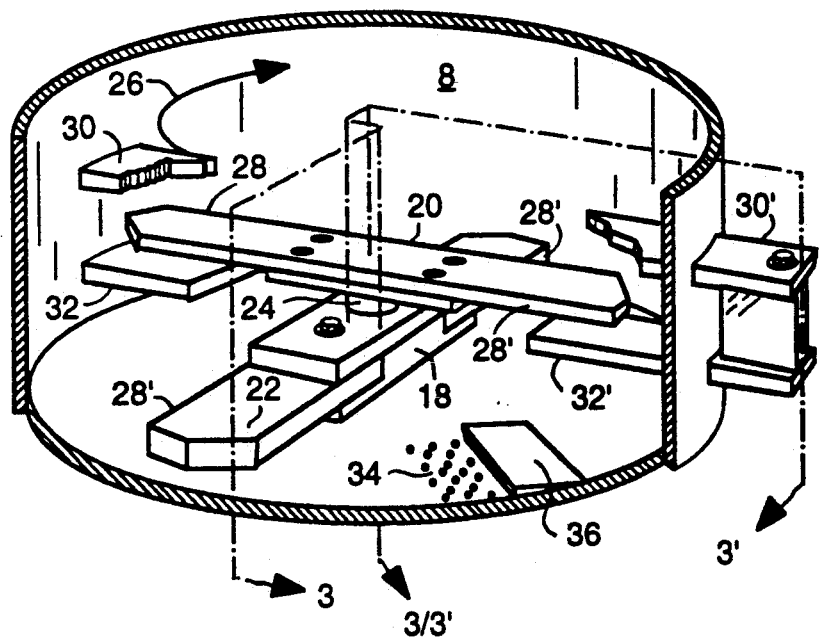
FIG. 2 is a perspective view of the multi-blade rotor and cooperating stators of the present invention.

FIG. 2 shows the relationship of the various components of the preferred embodiment of the apparatus of this invention. Within the containment vessel 8, a compound rotating blade assembly 18 is employed. This compound rotating blade assembly 18 is composed of an upper blade 20 and a lower blade assembly 22. The upper blade 20 and lower blade assembly 22 are separated by, and mounted by means of, a blade extension hub 24 (which will be shown in greater detail in subsequent drawings). The compound rotating blade assembly 18 revolves in a direction indicated by arrow 26, and interacts with the plastic granular material within the vessel on the leading edges 28 of the respective rotating blade members.

A compound stator assembly is supplied with a stationary upper stator 30 member and lower stator 32 members. As is the case in the prior art, the impact frequency imparted to the granulate material is substantially increased by its necessary interaction with the leading edges 28 of the upper blade 20 and a lower blade assembly 22 and the compound stationary stator blade members. However, because of the increased number of interacting surfaces against which the granulate must interact in the improved model, there is a two hundred and fifty percent increase in frontal surface interaction per revolution from that of the prior art.

In general, the upper blade 20 and lower blade assembly 22 are offset ninety degrees of rotation as shown in the drawing. This offset results in four lesser magnitude pulses per shaft revolution. (If the upper blade 20 and lower blade assembly 22 were in the same plane, the apparatus would generate two greater magnitude pulses per shaft revolution to accomplish the same energy transfer to the granulate material.)

This figure further shows the location of a single air inlet screen 34 and the air inlet deflector 36. Located in this manner, the entrainment air can be introduced into the lowest area of the process. The air inlet deflector 36 keeps the moving granulate from plugging the air inlet screen 34 and causes an enhanced turbulence into which the entraining air is introduced.

Figure 3:
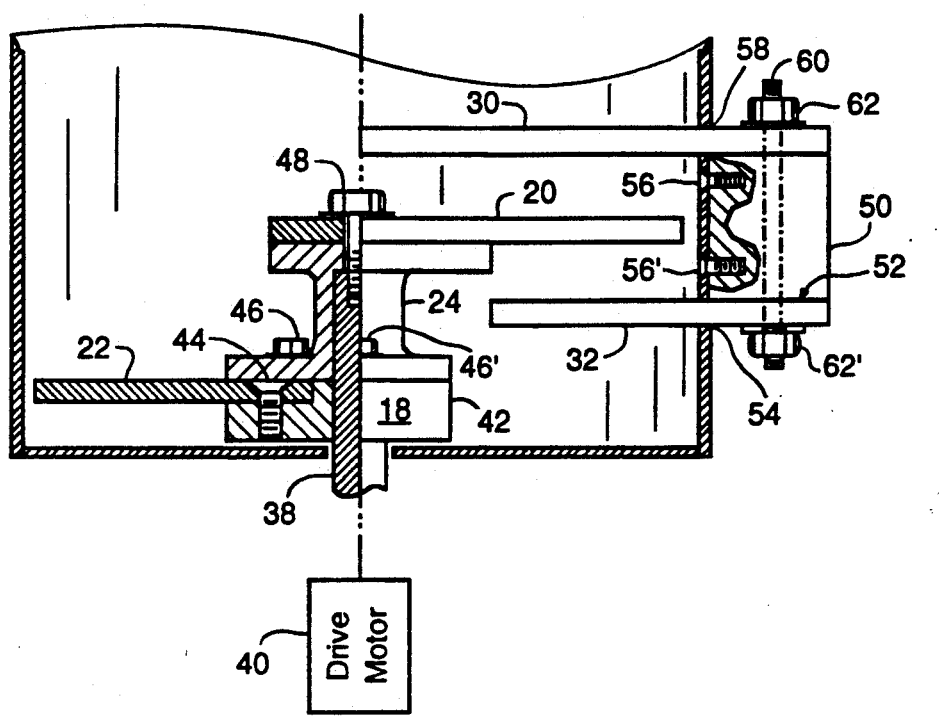
FIG. 3 is a sectional view of the rotating member along lines 3—3 and 3'—3' of FIG. 2.

FIG. 3 shows greater detail of the apparatus of FIG. 2. A central drive shaft 38 is either driven by the drive motor 40 or is the actual shaft of the electric drive motor 40. The central drive shaft 38 supports the rotating blade assembly 18 through the lower shaft mounted hub 42.

The rotating blade assembly 18 includes a lower shaft mounted hub 42 which is keyed directly to the central drive shaft 38. The lower shaft mounted hub 42 is internally threaded for the lower blade countersunk mounting bolts 44, and the hub mounting bolts 46. The blade extension hub 24 is also keyed to the central drive shaft 38 and is vertically located by drawing the shaft mounting bolt 48 tight into the central drive shaft 38.

The details of the stationary upper stator 30 and lower stator 32 members, and the mounting means, are also shown in FIG. 3. A stator spacing block 50 is welded to the lower stator 32 member in the preferred embodiment at 52, so that a lower stator 32 member (of which there are two) and the spacing block 50 become an integral unit. In mounting the stationary stator assembly, each of the lower units (comprised of a lower stator 32 member and a spacing block 50) are positioned into the containment vessel 8 through a lower mounting opening 54. In the preferred embodiment, two spacing block mounting bolts 56 are used to draw the spacing block 50 into intimate contact with the containment vessel 8 wall. The upper stator 30 member (of which there is a single member) is passed through two upper mounting openings 58 located at substantially 180 degrees of rotation from each other within the containment vessel 8 wall. The final assembly of the stationary stator assembly consists of fastening the upper stator member 30 to the spacing block 50 by means of a threaded shaft 60 member and fasteners 62.

Figure 4:
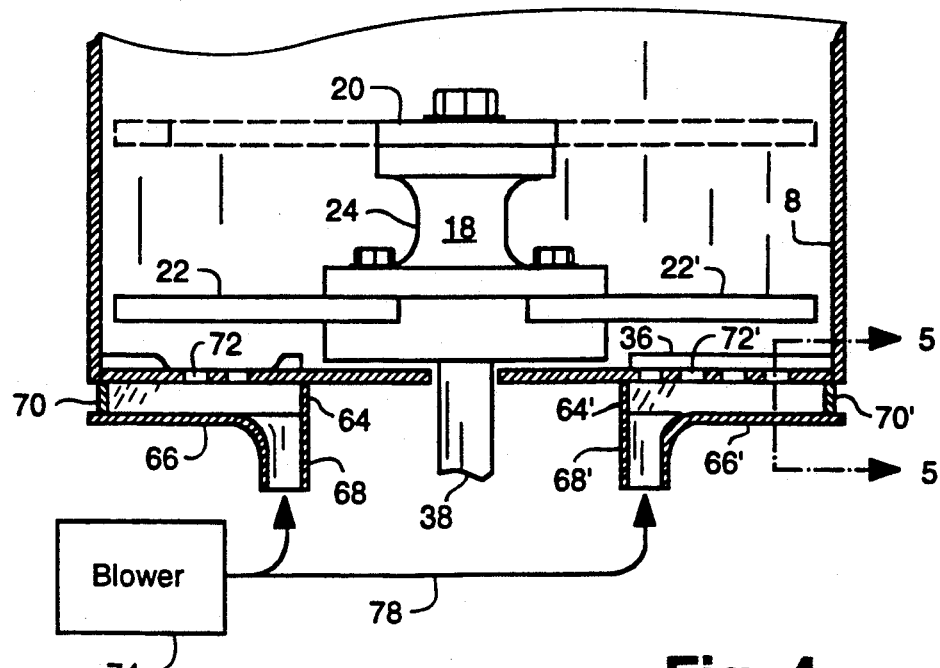
FIG. 4 is a sectional view of the rotating member and containment vessel showing the air induction entrance points.

FIG. 4 shows the detail of the forced air induction duct 64 assembly. In the preferred embodiment, a set of two forced air induction duct 64 assemblies are mounted to the underside of the containment vessel 8 at substantially 180 degrees of rotation from each other. Said forced air induction duct assemblies generally consist of a channel member 66 welded to the bottom of the containment vessel 8 with a duct connection tube 68 located toward the drive shaft 38 extremity of said channel member. A removable clean-out plug 70 closes the open extremity of the channel member 66. A series of air passage drillings 72 (which comprise the air inlet screen 34) provide air passage from the channel member 66 into the containment vessel 8. The forced air induction duct 64 assemblies are connected to an induction blower 74 by means of induction blower ducts 78.

To facilitate cleaning of the equipment, as would be necessary when changing materials, the clean-out plug 70 is removed with the induction blower 74 running. This will force inadvertently trapped material out of the forced air induction duct 64 assemblies.

Figure 5:
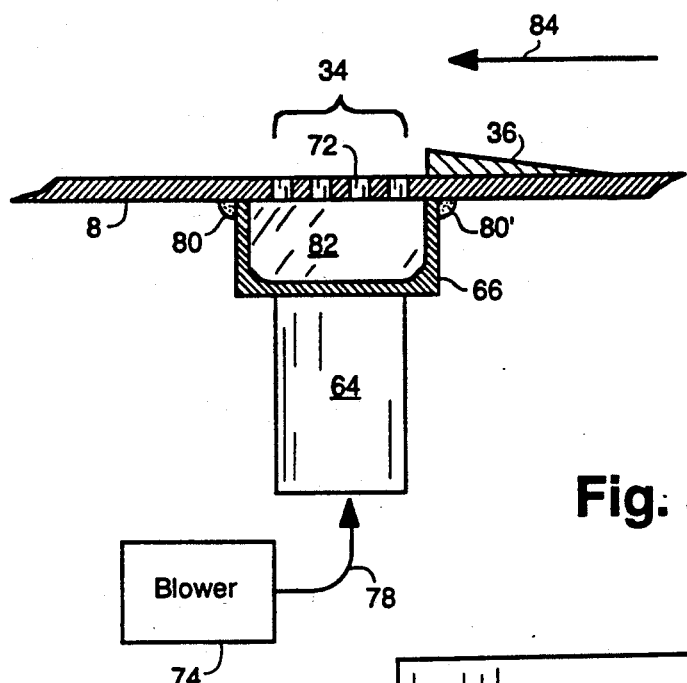
FIG. 5 is a sectional view of the air induction system along lines 5—5 of FIG. 4.

FIG. 5 indicates the construction details of the forced air induction duct 64 assembly. In the preferred embodiment, a channel member 66 is welded to the containment vessel 8 as indicated at 80 forming an enclosed air plenum 82. A duct connection tube 68 is attached to the channel member 66 in such a manner that the forced air induction duct 78 can be conveniently attached. As the air plenum 82 is pressurized, air is forced through the air passage drillings 72 and into the process area.

The air inlet deflector 36 is shown in proper location to the air inlet screen 34. As indicated by arrow 84, the material travels over the air inlet deflector 36 creating a turbulence void over the air inlet screen 34 which prevents moving granulate from plugging the air passage drillings 72 and aids in the dispersion of pressurized air into the process material.

Figure 6:
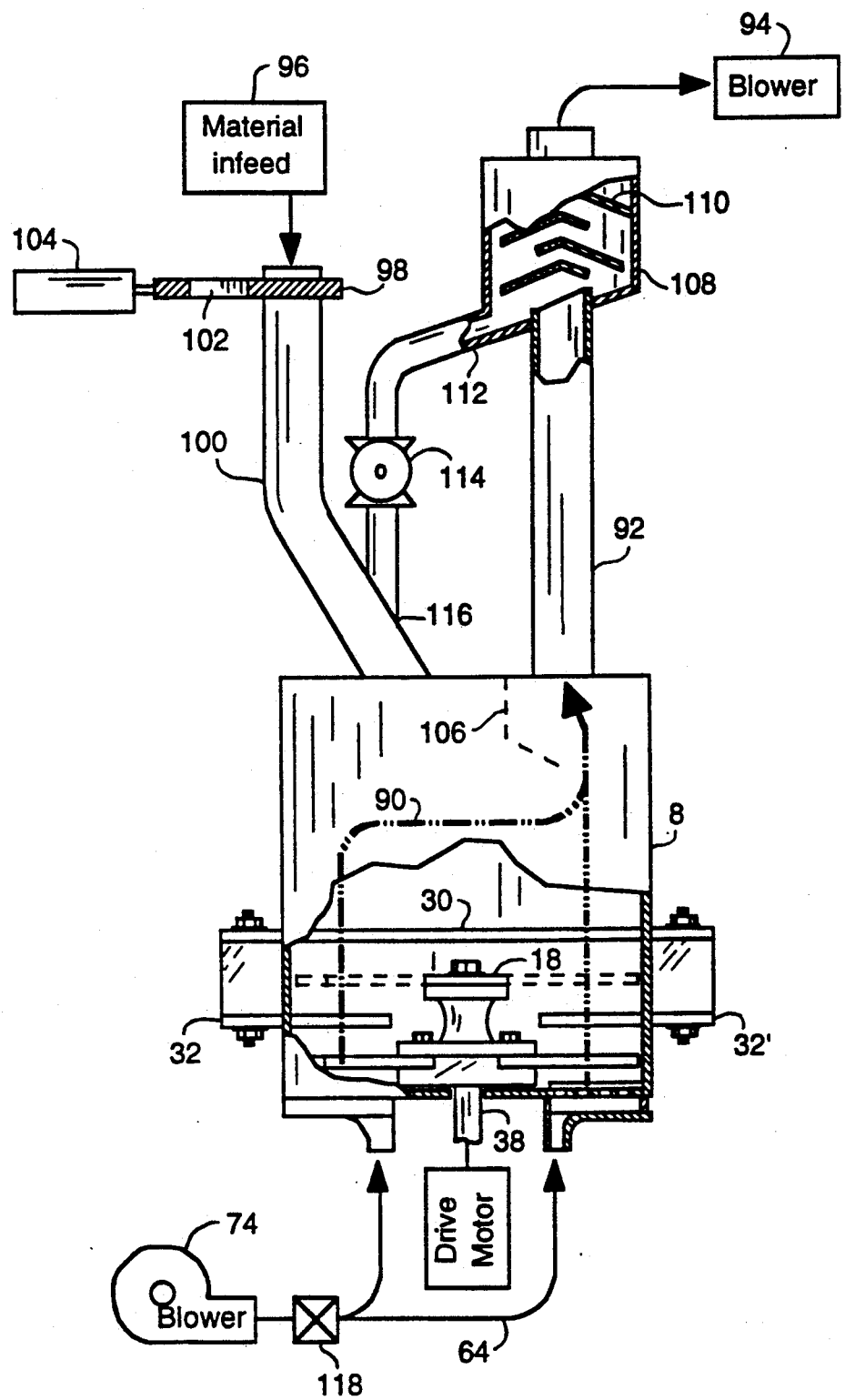
FIG. 6 is an elevation view of the entire apparatus with partial cut-away sections.

FIG. 6 shows the relationship of all primary components of the operational system as taught in this invention. The label removal apparatus includes the containment vessel 8, the compound rotating blade assembly 18 and the stationary members composed of the upper stator 30, and the lower stator 32 members. The rotating blade assembly 18 is driven by a drive motor 40 through its central drive shaft 38. As will be seen in FIG. 8 as compared with FIG. 7, the rotating blade assembly 18 of this invention working cooperatively with said stationary members results in substantially greater process efficiency.

Further efficiency is gained, however, by additional auxiliary equipment as indicated in the present figure. As already shown, an air induction blower 74 is provided which causes an entrainment air flow (as indicated by arrow 90) through the granulate during process. Said entrainment air will separate the fines (the light fibrous and plastic film contaminants) from the granulate. The fines will subsequently be drawn into the discharge stack 92, from which they will be carried from the process area.

A secondary blower 94 is used at the final extremity of the air induction system; a push-pull induction system has enhanced efficiency. (That is, the primary air induction blower 74 "pushes" the air into the process, while the secondary blower 94 "pulls" the air from the process.) With the use of a push-pull system, a more uniform air pressure gradient is achieved throughout the process.

In order to gain the greatest efficiency from the push-pull air induction system, it is necessary to have the containment vessel 8 substantially enclosed from atmosphere. That is, there are no openings to atmosphere when the apparatus is in operation. It is thus necessary to provide material loading openings with positive seals. In the case of the material infeed 96, the material must pass through a positive seal slide gate 98. When in the open position, the material will pass from the material infeed 96 hopper to the infeed tube 100 through the slide gate opening 102. In the closed position (as indicated in the drawing) the slide gate 98 prevents either granulate material or atmospheric air from entering the process. In the preferred embodiment, the slide gate 98 is operated by an air cylinder actuator 104.

It can be determined that air entrainment of the fines occurs best at high air velocities. When such velocities are achieved, some granulate will be exhausted with the undesirable fines. A containment vessel baffle 106 is added to deflect heavier material back to the process. Additionally, a substantially tall discharge stack 92 causes the heavier granulate to drop out of the discharge flow. Finally, a baffle box 108, which consists of a series of alternating internal baffles 110, is used to classify the heavier granulate material and the undesirable fines. Granulate material settles to a steeply inclined return line 112 where it falls to a mechanical rotary air lock 114. (The air lock 114 is used to maintain the air pressure differential between the internal blower driven air stream 90 and atmospheric air pressure.) From the air lock 114 the granulate is returned to the infeed tube 100 at 116.

In another embodiment, it is desirable to reduce the internal air pressure for loading when the slide gate 98 is in the open 102 position. In this application, a primary air induction blower shuttle valve 118 is used to momentarily exhaust the primary induction blower 74 air to atmosphere. Thus, while the slide gate 98 is in the open 102 position, the shuttle valve 118 is positioned to divert air away from the forced air induction duct 64 system.

Figure 7:
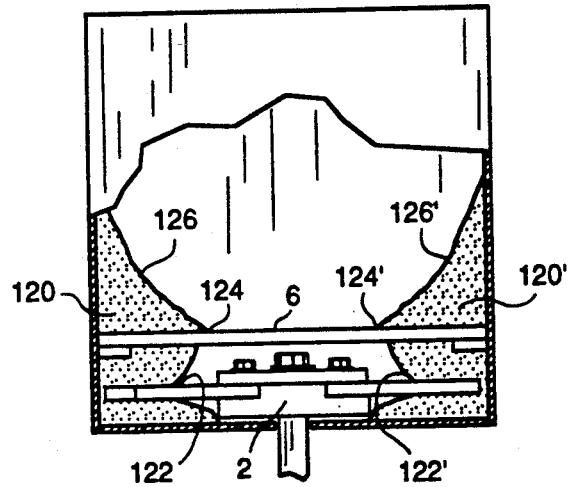
FIG. 7 is a sectional view of the containment vessel and rotor showing a hypothetical view of the material slope of the prior art.

FIG. 7 is a hypothetical cross sectional view of the apparatus of the prior art during operation with a normal charge of granulate. The rotating blade assembly 2 deforms the granulate 120 as indicated at 122. The stator blade member 6 causes a rapid decrease in the velocity of the granulate 120 at 124. The decrease in velocity causes the granulate 120 to form a high slope as indicated at 126.

Figure 8:
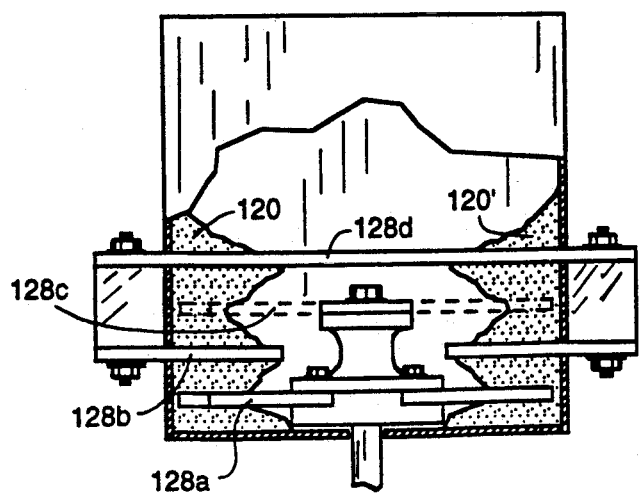
FIG. 8 is a sectional view of the containment vessel, rotor, and cooperating stator bars showing a hypothetical view of the material slope of the enhanced apparatus.

FIG. 8 is a hypothetical cross sectional view of the improved apparatus of this invention. By increasing the number of stages (which are identified in this figure as 128a, 128b, 128c, and 128d), the material is held in more intimate contact with alternating rotating and stationary members. This modification results in significantly greater turbidity of the granulate 120.

OPERATION

The apparatus and method of the prior art consists of a processing device designed to remove contamination from granulated materials prior to final reprocessing. Specifically, the apparatus is designed to remove product labels affixed to plastic base materials subsequent to granulation of the intact plastic item. Such is primarily the case with blow molded plastic containers having printed paper, plastic, or other fibrous material product labels.

The prior art employs a revolving blade or series of blades operating in a single plane relative to the containment vessel. This blade (or blades) causes the granulated material to interact with a series of small stator blades 130 underneath, and a stator blade member 6 above. Thus, in the prior art, the mechanical action imparted to the granulated material is confined to a single plane of rotating blades interacting with stationary members below and above this rotating blade or blades. The result is that when the containment vessel is filled such that the material in process is above the level of the rotating and stationary blades, the material is processed only as it randomly works back into the process area. That is, material swirling above the stator area is not actively being processed in the prior art even though it is in motion.

Also, in the prior art, subsequent to the removal of the label material (which is most commonly a fiber) and its companion adhesive from the base plastic material, these lighter materials are entrained by a moving air current and exhausted from the process area. However, this air current is confined to an area above, and extraneous to, the actual process area in which the mechanical forces are imparted to the granulated material.

It is the primary objective of this design enhancement and method to improve three actions of the prior art. First, the mechanical action in the form of friction which is imparted to the granulate is improved by substantially increasing the ratio of stationary and rotating members. Secondly, the removal of the loosened fines is significantly enhanced by forcing the exhaust air through the process rather than merely drawing free air from the top of the process (as will be further explained). Finally, by means of an enclosed process area including a push-pull air flow, a baffle box, air lock and related equipment, the entrainment air through the material is increased to a substantially high velocity resulting in greatly improved contamination removal characteristics.

The descriptions accompanying the figures thus far explained should indicate that significantly greater turbulence has been introduced into the process by the addition of multiple stages of rotating and stationary members. The primary action employed by the prior art to remove the label contaminants from the granulate base material is the impact of a high velocity blade with a lower velocity granulate. Inasmuch as it is the impacting action of velocity differential between the plastic granulate and the impacting member, it should now be apparent that increasing the frequency of impact against lower rotational velocity plastic (which is a function of the rotating members), or, increasing the frequency of impact of higher rotational velocity plastic against stationary members (which is the function of the stator members) will enhance the process. Such a result has been achieved by the improvements to the prior art as described in this document.

It should be noted that the prior art may also use a series of small stator blades 130 arranged around the periphery of the containment vessel 8 as indicated by detail 130 of FIG. 1. (Such an arrangement is often found in densifier—or "puffer"—equipment used to reprocess film materials.) These small stator blades 130 certainly increase the turbulence of the process. The cumulative effect of the substantially larger stationary members of this invention, however, considerably add to anything heretofore attainable within the prior art.

The means of securing the stator assembly of this invention provide a greater safety margin in the event of failure than does the prior art. As shown in FIG. 1, the prior art attaches the stator blade member 6 to stator blade mounting tabs 10 within the containment vessel 8. It is conceivable that the stator blade member 6 could either loosen in operation or be broken from its mounting area in the event of catastrophic failure. In either case, the now free end of the blade member 6 could become fouled with the rotating blade. In the present invention, the upper stator 30 member cannot become fouled with the compound rotating blade assembly 18 even in the event of a completely disengaged spacing block mounting bolt 56 inasmuch as the upper stator 30 member extends a substantial length beyond the periphery of the containment vessel 8.

For efficient operation of this label removal equipment, it is also necessary to rapidly remove the loosened fine waste materials from the granulate. Referring again to FIG. 1, the limitation of the prior art can be defined. The upper portion of the containment vessel 8 is open to atmosphere. A fan driven collection device is so mounted on a discharge vent 132, that air is drawn over the surface of the process material as indicated by line 134. In this manner, only those fine materials which are separated from the mass of the granulate are entrained in the discharge air flow 134.

In the improvement of the present invention, careful attention has been given to the need for the air flow through the entire mass of the granulate. By thus sealing the containment vessel 8 from atmosphere and introducing a high pressure air flow 90 which flows through the entire granulate mass, removal of fine waste is greatly accelerated.

This improvement in the prior art has thus greatly increased the efficiency of the process by enhancing the mechanical removal of label material from the granulate, and by more rapidly clearing the free label material from the process mass. The net result is less dwell time in the process which results in greater equipment efficiency and higher through-put.

While the present invention has been described in conjunction with a single embodiment, it is to be understood that various modifications and other embodiments of the present invention may be made without departing from the scope of the invention as described herein and as claimed in the appended claims.

The embodiments of the invention in which an exclusive property or privilege is claimed are defined below.

What I claim is:

1. An improvement to an existing method for decontaminating thermoplastic materials, said existing method including the steps of: placing into a container a quantity of contaminated material consisting essentially of pieces of thermoplastic material from molded plastic containers and contaminant adhered thereto and mixed therewith; mechanically agitating said contaminated material in said container until some of said contaminants are dislodged from adhesion to said pieces of thermoplastic material; thereupon spraying a predetermined amount of liquid solvent into said container with said contaminated material; thereafter continuing to agitate said contaminated material together with said solvent and, by said agitation action, separating more of said contaminants from adhesion to said pieces of thermoplastic material; substantially continuously withdrawing a stream of gas from said container while performing said steps of decontaminating said thermoplastic materials; ceasing agitation of said pieces of thermoplastic material; and, thereafter removing said pieces of thermoplastic material from said container; to said existing method of decontaminating thermoplastic materials, improvements are added comprising:
   a) a first step wherein said process mass is subjected to high frequency impact within an apparatus comprised of rotating blade members mounted on a substantially vertical shaft, said rotating blade members operating on at least two planes cooperating with at least two stationary members on at least two planes within a processing area of said apparatus;
   b) a second step wherein said containment vessel is substantially closed to atmospheric pressure,
   c) a third step wherein air at high velocity is forced into said process mass at substantially the bottom of a containment vessel of said apparatus whereby turbulence is induced at the mixing point of said air at high velocity and said process mass, and wherein said air at high velocity entrains said paper or plastic product label material waste and carries it away from said granulated plastic container material;
   d) a forth step wherein said air containing entrained paper or plastic product label material waste is directed through an air classification member for the purpose of separating said paper or plastic product label material waste from inadvertently entrained granulated plastic container material; and,
   e) a fifth step wherein an air lock means separating said air classification member and said containment vessel is provided whereby said inadvertently entrained granulated plastic container material is returned to said process mass.

2. The method of claim 1 wherein said rotating blade members consist of an upper blade which is substantially offset in rotation from a lower blade assembly.

3. The method of claim 1 wherein said rotating blade members are separated by a blade extension hub in conjunction with a drive shaft which is a sole mounting means for said upper blade to said lower blade assembly.

4. The method of claim 1 wherein a multiple stage stator assembly consists of an upper stator composed of a single member, traversing the diameter of said containment vessel.

5. The method of claim 1 wherein said multiple stage stator assembly has a lower stator assembly which consists of a plurality of members.

6. The method of claim 1 wherein a stator spacing block and requisite fasteners for assembly of said multiple stage stator assembly are on the exterior of said process containment vessel.

7. The method of claim 1 wherein a rotating blade assembly consists of two elements, each of said rotating blade elements on a separate plane, and said stator assembly consists of two elements, each of said stator elements on a separate plane, and wherein each of said rotating blade elements cooperates with at least one corresponding stator element.

8. The method of claim 1 wherein at least one air inlet screen is located on the bottom portion of said containment vessel.

9. The method of claim 1 wherein said air inlet screen cooperates with an adjacent air inlet deflector.

10. The method of claim 1 wherein a push-pull air induction system is utilized.

11. The method of claim 1 wherein a containment vessel baffle provides a tortuous path for an exhaust air stream.

12. The method of claim 1 wherein a baffle box classifies said exhaust air stream of said inadvertently entrained granulated plastic container material.

13. The method of claim 1 wherein a return line between said baffle box classifier and an infeed tube is sealed from atmospheric air pressure by a rotary air lock.

14. The method of claim 1 wherein said infeed tube is sealed from atmospheric air pressure by a slide gate.

* * * * *